(12) United States Patent
Haberkamp

(10) Patent No.: US 6,669,913 B1
(45) Date of Patent: Dec. 30, 2003

(54) COMBINATION CATALYTIC CONVERTER AND FILTER

(75) Inventor: William C. Haberkamp, Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/522,152

(22) Filed: Mar. 9, 2000

(51) Int. Cl.[7] .................... F01N 3/022; F01N 3/10; B01D 46/02; B01D 53/94
(52) U.S. Cl. .................. 422/180; 422/171; 422/177; 55/521; 55/385.3; 55/DIG. 30
(58) Field of Search .................. 422/168–171, 422/177, 180; 55/DIG. 30, 523, 521, 482, 385.3

(56) References Cited

U.S. PATENT DOCUMENTS

| | | | |
|---|---|---|---|
| 1,893,372 A | 1/1933 | Kryzanowsky | 422/173 |
| 1,924,472 A | 8/1933 | Thomson | 156/150 |
| 2,410,371 A | 10/1946 | Vokes | 55/500 |
| 2,553,054 A | 5/1951 | Lincoln et al. | 156/197 |
| 3,025,964 A | 3/1962 | Summers et al. | 55/500 |
| 3,441,381 A | 4/1969 | Keith et al. | 422/179 |
| 3,692,184 A | 9/1972 | Miller, Jr. et al. | 55/449 |
| 3,708,957 A | 1/1973 | Labadie | 95/277 |
| 3,799,354 A | 3/1974 | Buckman et al. | 55/498 |
| 3,844,749 A | 10/1974 | Carter, Sr. | 55/358 |
| 4,056,375 A | 11/1977 | Ringel et al. | 96/381 |
| 4,130,487 A | 12/1978 | Hunter et al. | 96/131 |
| 4,157,902 A | 6/1979 | Tokar | 55/327 |
| 4,410,427 A | 10/1983 | Wydevan | 210/317 |
| 4,419,108 A | 12/1983 | Frost et al. | 422/180 |
| 4,430,223 A | 2/1984 | Miyakawa et al. | 55/498 |
| 4,441,899 A | 4/1984 | Takagi et al. | 55/485 |
| 4,455,823 A | 6/1984 | Bly et al. | 96/405 |
| 4,498,989 A | 2/1985 | Miyakawa et al. | 55/492 |
| 4,548,626 A | 10/1985 | Ackley et al. | 96/139 |
| 4,589,983 A | 5/1986 | Wydevan | 55/498 |
| 4,619,675 A | 10/1986 | Watanabe | 55/498 |
| 4,542,286 A | 3/1987 | Kusuda et al. | 281/2 |
| 4,652,286 A | 3/1987 | Kusuda et al. | 55/523 |
| 4,857,089 A | * 8/1989 | Kitagawa et al. | 55/523 |
| 4,878,929 A | 11/1989 | Tofsland et al. | 55/486 |
| 4,902,487 A | 2/1990 | Cooper et al. | 422/215.5 |

(List continued on next page.)

FOREIGN PATENT DOCUMENTS

| | | |
|---|---|---|
| GB | 563768 | 2/1943 |
| WO | WO 88/03431 | 5/1988 |

*Primary Examiner*—Hien Tran
(74) *Attorney, Agent, or Firm*—Andrus, Sceales, Starke & Sawall, LLP

(57) ABSTRACT

A combination catalytic converter and filter (10) for internal combustion engine exhaust is provided by a single unitary flow member having an upstream frontside (14) and a downstream backside (16). The member has a plurality of flow channels (18) extending axially from the upstream frontside to the downstream backside. Each channel has left and right sidewalls (20 and 22) formed by pleated filter media (24), and top and bottom walls formed by respective upper and lower boundary layers (26 and 28). The left and right sidewalls (20 and 22) extend axially continuously from the upstream frontside to the downstream backside. The sidewalls (20 and 22) have first upstream sections (30, 32) proximate the upstream frontside (14), and second downstream sections (34, 36) proximate the downstream backside (16). One of the sections is a catalytic section (33) treated with a catalyst for the exhaust. The other of the sections is a filter section (35) having axially spaced alternately blocking sealants (38, 40) in alternate channels (48, 44) such that exhaust must pass through the pleated filter media (24). The catalytic section may be upstream or downstream of the filter section. A filter section may be nested axially between two catalytic sections, as well as other combinations and sequencing. The filter section may additionally be treated with catalyst.

19 Claims, 2 Drawing Sheets

U.S. PATENT DOCUMENTS

| | | | |
|---|---|---|---|
| 4,925,561 A | 5/1990 | Ishii et al. | 55/499 |
| 5,008,086 A | 4/1991 | Merry | 422/180 |
| 5,015,376 A | 5/1991 | Picek | 55/381 |
| 5,030,263 A | 7/1991 | Kemp | 55/477 |
| 5,035,236 A | 7/1991 | Kanegaonkar | 55/498 |
| 5,089,237 A * | 2/1992 | Schuster et al. | 422/180 |
| 5,106,397 A | 4/1992 | Jaroszczyk et al. | 96/388 |
| 5,137,696 A | 8/1992 | Hitachi et al. | 422/180 |
| 5,174,895 A | 12/1992 | Drori | 96/233 |
| 5,252,299 A | 10/1993 | Retallick | 422/174 |
| D342,990 S | 1/1994 | Jaroszczyk | |
| 5,298,046 A | 3/1994 | Peisert | 55/486 |
| 5,304,351 A | 4/1994 | Tanaka et al. | 422/180 |
| 5,322,537 A | 6/1994 | Nakamura et al. | 55/523 |
| 5,346,675 A | 9/1994 | Usui et al. | 422/180 |
| 5,385,873 A | 1/1995 | MacNeill | 422/179 |
| 5,468,384 A | 11/1995 | Garcera et al. | 55/523 |
| 5,480,621 A | 1/1996 | Breuer et al. | 422/174 |
| 5,546,069 A | 8/1996 | Holden et al. | 310/29 |
| 5,549,722 A | 8/1996 | Zemaitis et al. | 55/463 |
| 5,562,825 A | 10/1996 | Yamada et al. | 55/498 |
| 5,632,792 A | 5/1997 | Haggard | 55/497 |
| 5,380,501 A | 1/1998 | Hitachi et al. | 422/180 |
| 5,772,883 A | 6/1998 | Rothman et al. | 55/500 |
| 5,792,247 A | 8/1998 | Gillingham et al. | 96/386 |
| 5,820,646 A | 10/1998 | Gillingham et al. | 55/488 |
| 5,846,641 A | 12/1998 | Abeles et al. | 428/312.8 |
| 5,863,311 A | 1/1999 | Nagai et al. | 55/483 |
| 5,891,402 A | 4/1999 | Sassa et al. | 422/171 |
| 5,902,364 A | 5/1999 | Tokar et al. | 55/498 |
| 5,908,480 A | 6/1999 | Ban et al. | 60/311 |
| 5,925,561 A | 7/1999 | Posselius, Jr. et al. | 435/286.1 |
| 5,961,931 A | 10/1999 | Ban et al. | 422/171 |

* cited by examiner

COMBINATION CATALYTIC CONVERTER AND FILTER

BACKGROUND AND SUMMARY

The invention relates to exhaust emission devices for internal combustion engines, including diesel engines, and more particularly to catalytic converters and to filters.

Various diesel exhaust aftertreatment systems require that the exhaust be directed through a catalytic component and also through a filter component to achieve emissions and/or particulate (e.g. soot) reduction. The present invention provides a simple system combining these devices in a singular unit. In a desirable aspect, the invention further maintains exact axial alignment of catalytic and filter flow channels and simplifies packaging.

DETAILED DESCRIPTION

Figure 1:
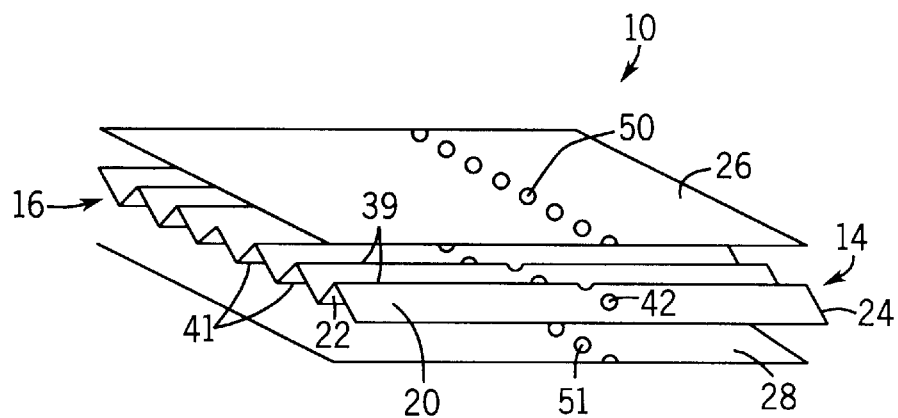
FIG. 1 is an exploded perspective view of a combination catalytic converter and filter in accordance with the invention.
Figure 2:
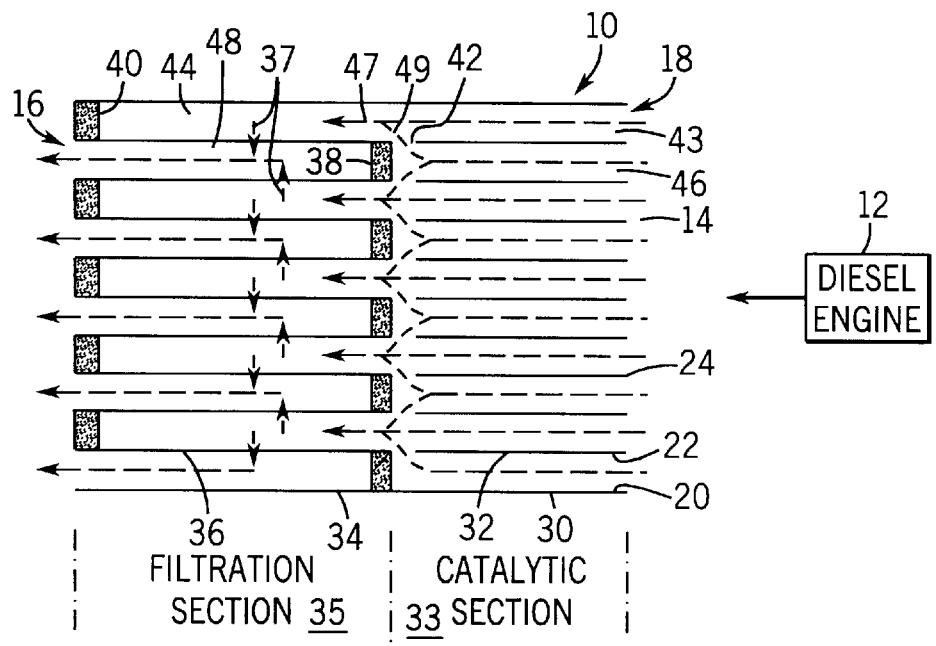
FIG. 2 is a sectional view from above of the device of FIG. 1.

FIGS. 1 and 2 show a combination catalytic converter and filter 10 for an internal combustion engine such as diesel engine 12. The combination catalytic converter and filter is provided by a single unitary flow member having an upstream frontside 14 and a downstream backside 16. Member 10 has a plurality of flow channels 18 extending axially from upstream frontside 14 to downstream backside 16. Each channel has left and right sidewalls such as 20 and 22 formed by pleated filter media 24, and top and bottom walls formed by respective upper and lower boundary layers 26 and 28. Left and right sidewalls 20 and 22 extend axially continuously from upstream frontside 14 to downstream backside 16. The sidewalls have upstream sections 30, 32, etc. proximate frontside 14, and downstream sections 34, 36, etc. proximate backside 16. Upstream sections 30, 32, etc. provide a catalytic section 33 treated with a catalyst for the exhaust. Downstream sections 34, 36, etc. provide a filter section 35 and have axially spaced alternately blocking sealants 38, 40, etc. in alternate channels such that exhaust flow must pass through pleated filter media 24 in filter section 35, as shown at arrows such as 37. Each of left and right sidewalls 20, 22, etc. extends axially rectilinearly from catalytic section 33 to filter section 35, maintaining exact axial alignment of the respective channels including the catalyzing and filtering sections thereof. Pleated filter media 24 is a continuous sheet spanning both catalytic section 33 and filter section 35.

In one preferred embodiment, catalytic section 33 is upstream of filter section 35. A first set of alternating blocking sealants 38, etc. are at the upstream ends of respective channels in filter section 35, and a second set of alternating blocking sealants 40, etc. are at downstream ends of respective channels in filter section 35. In this embodiment, it is preferred that the sidewalls of the channels of catalytic section 33 are perforated as shown at 42 such that exhaust flows through catalytic section 33 along a first set of alternate channels such as 43 rectilinearly aligned with a first set of alternate channels such as 44 in filter section 35, and exhaust also flows through catalytic section 33 along a second set of alternate channels such as 46 laterally offset from first set of channels 43 and communicating therewith through the perforations 42, such that exhaust flows through all of the channels of catalytic section 33 notwithstanding the noted alternating blocking sealants 38, 40 in filter section 35. Exhaust flow through all of the channels of catalytic section 33 is desirable to increase surface area for catalytic activity. In this embodiment, the noted first set of alternate channels 43 in catalytic section 33 are open at their downstream ends 47, and exhaust flows rectilinearly from such first set of channels 43 in catalytic section 33 to first set of alternate channels 44 in filter section 35. The downstream ends of the first set of channels 44 in filter section 35 are blocked by the noted second set of alternating blocking sealants 40. The noted second set of alternate channels 46 in catalytic section 33 are blocked at their downstream end by the noted first set of alternating blocking sealants 38 in the upstream ends of second set of alternate channels 48 in filter section 35. Perforations 42 are upstream of the noted first set of alternating blocking sealants 38, such that exhaust flows axially along the noted second set of channels 46 in catalytic section 33 and then laterally through perforations 42 as shown in dashed line at arrows such as 49 in FIG. 2 and joins the flow in the first set of channels 43 in catalytic section 33 flowing axially rectilinearly into the noted first set of channels 44 in filter section 35. Sealant is applied along the upper pleat tips as shown at 39 downstream of perforations 42, to seal the upper tips of pleated filter media 24 to upper boundary layer 26. Sealant is applied along the lower pleat tips as shown at 41 downstream of perforations 42, to seal the lower tips of pleated filter media 24 to lower boundary layer 28.

Figure 3:
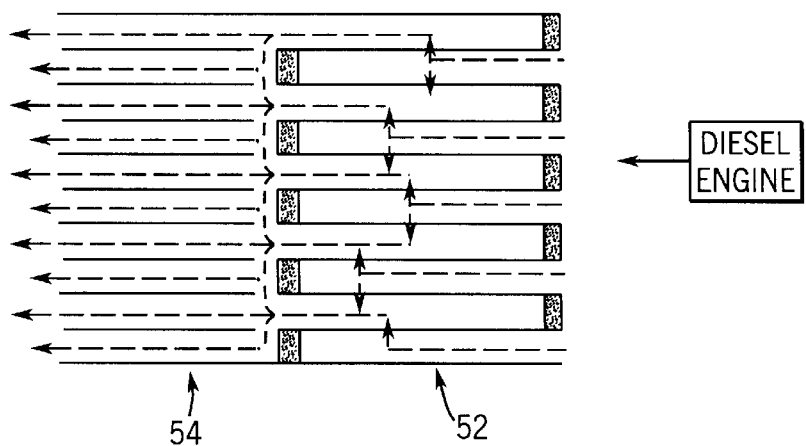
FIG. 3 is a view like FIG. 2 and shows another embodiment.
Figure 4:
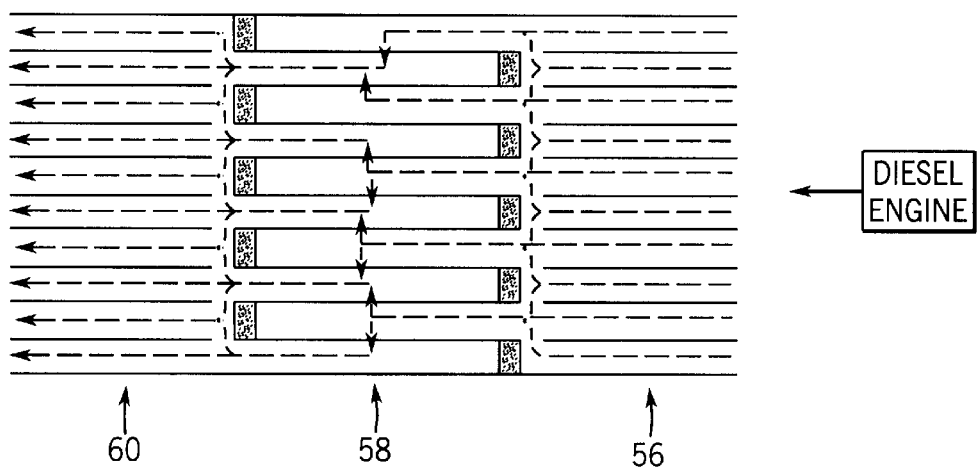
FIG. 4 is a view like FIG. 2 and shows another embodiment.

In another embodiment, the catalytic section may be downstream of the filter section, as shown in FIG. 3 at upstream filter section 52 and downstream catalytic section 54. In a further embodiment, a second catalytic section may be added to the configuration of FIG. 2 downstream of the filter section, such that a filter section is nested between two catalytic sections, i.e. catalyst/filter/catalyst, for example as shown in FIG. 4 at upstream catalytic section 56, downstream filter section 58 and further downstream catalytic section 60. In another embodiment, the filter section of the unitary member is treated with a catalyst. For example, in FIG. 2, filter section 35 is further treated with a catalyst to oxidize soot or collected contaminant, while the catalytic treatment in catalytic section 33 reduces or acts upon another gaseous portion of the exhaust. Thus, the device is provided with different catalytic treatments at different sections so that separate functions occur. In further embodiments, filter sections 52, FIG. 3 and 58, FIG. 4, may also be provided with catalytic treatment. Other combinations and sequencing are possible.

In preferred form, the device of FIG. 1 is wrapped in a spiral, for example as shown in U.S. Pat. Nos. 4,652,286 and 5,908,480, incorporated herein by reference, to provide a multilayered structure. In such embodiment, one of the upper or lower boundary layers 26 or 28 may be eliminated, because in a spiral wrap the remaining layer provides the boundary for the channels on opposite sides thereof. Boundary layers 26 and/or 28 may be formed of a sheet of filter media or may be impervious to the exhaust flow. Boundary layers 26 and/or 28 may be perforated as shown at 50 and 51 which perforations are laterally aligned with perforations 42. In another embodiment, the single row of channels in FIG.

1 may be stacked, for example as shown in incorporated U.S. Pat. No. 4,652,286, to provide a plurality of rows and columns of channels. In such stacked structure one of the boundary layers 26 or 28 may be eliminated because the remaining layer will provide a boundary layer for the channels on opposite sides thereof, e.g. if top layer 26 is omitted, then layer 28 of the second row of channels will provide the bottom wall for such second row of channels and will provide the top wall for the first row of channels therebelow.

It is recognized that various equivalents, alternatives and modifications are possible within the scope of the appended claims.

What is claimed is:

1. A combination catalytic converter and filter for internal combustion engine exhaust comprising in a single unitary member pleated filter media and upper and lower boundary layers defining a plurality of axially extending flow channels having first and second serially sequential axial sections, one of said first and second sections being a catalytic section treated with a catalyst for said exhaust, the other of said first and second sections being a filter section with alternately sealed said channels forcing exhaust to flow through said pleated filter media, wherein said channels extend axially from upstream to downstream, said first section having a first upstream end and a first downstream end, said second section having a second upstream end and a second downstream end, said second upstream end being axially contiguous to and forming an axial junction with said first downstream end, wherein exhaust flows axially from said first upstream end then to said axial junction then axially to said second downstream end, and wherein said filter section is formed between axially spaced first and second sets of alternating blocking sealants in said channels, said first set of sealants being at said axial junction, said second set of sealants being at one of said second downstream end and said first upstream end, said first set of sealants being axially spaced between said first upstream end and said second downstream end.

2. The invention according to claim 1 wherein said first set of sealants is axially spaced downstream from said first upstream end by said first section therebetween, and said first set of sealants is axially spaced upstream from said second downstream end by said second section therebetween.

3. The invention according to claim 2 wherein said catalytic section is upstream of said filter section.

4. The invention according to claim 2 wherein said filter section is upstream of said catalytic section.

5. The invention according to claim 2 further comprising in combination a third serially sequential axial section, said second section being nested between said first and third sections in axial alignment therewith.

6. The invention according to claim 5 wherein said first and third sections are catalytic sections, and said second section is a filter section.

7. The invention according to claim 2 wherein said first section is said catalytic section, said second section is said filter section, said first section is upstream of said second section, said first set of alternating blocking sealants is at the upstream end of said filter section, said second set of alternating blocking sealants is at the downstream end of said filter section.

8. The invention according to claim 2 wherein said filter section is treated with catalyst.

9. The invention according to claim 2 wherein said upper and lower boundary layers are formed by a single layer in a spiral wrap.

10. A combination catalytic converter and filter for internal combustion engine exhaust comprising a single unitary flow member having an upstream side and a downstream side, said member having a plurality of flow channels extending axially from said upstream side to said downstream side, each channel having left and right sidewalls formed by pleated filter media, and top and bottom walls formed by respective upper and lower boundary layers, said left and right sidewalls extending axially continuously from said upstream side to said downstream side, said sidewalls having first upstream sections proximate said upstream side, said sidewalls having second downstream sections proximate said downstream side, one of said first and second sections being a catalytic section treated with a catalyst for said exhaust, the other of said first and second sections being a filter section and having axially spaced alternately blocking sealants in alternate said channels such that exhaust must flow through said pleated filter media, wherein said channels extend axially from upstream to downstream, said first section having a first upstream end and a first downstream end, said second section having a second upstream end and a second downstream end, said second upstream end being axially contiguous to and forming an axial junction with said first downstream end, wherein exhaust gas flows axially from said first upstream end then to said axial junction then axially to said second downstream end, and wherein said filter section is formed between axially spaced first and second sets of said alternating blocking sealants in said channels, said first set of sealants being at said axial junction, said second set of sealants being at one of said second downstream end and said first upstream end, said first set of sealants being axially spaced between said first upstream end and said second downstream end.

11. The invention according to claim 10 wherein said first set of sealants is axially spaced downstream from said first upstream end by said first section therebetween, and said first set of sealants is axially spaced upstream from said second downstream end by said second section therebetween.

12. The invention according the claim 11 wherein said sidewalls of said catalytic section are perforated such that exhaust flows through said catalytic section along a first set of alternate channels axially rectilinearly aligned with a first set of alternate channels in said filter section, and exhaust flows through said catalytic section along a second set of alternate channels laterally offset from said first set of channels and communicating therewith through said perforations, such that exhaust flows through all of the channels of said catalytic section, increasing surface area for catalytic activity, notwithstanding said alternating blocking sealants in said filter section.

13. The invention according to claim 11 wherein said sidewalls have third downstream sections downstream of said second sections, said second sections being nested between in axial alignment with said first and third sections, each of said left and right sidewalls of each channel extending axially rectilinearly from said first section to said second section to said third section, maintaining exact axial alignment of the respective said channel.

14. The invention according to claim 13 wherein said first and third sections are catalytic sections, and said second section is a filter section.

15. The invention according to claim 11 wherein said filter section is treated with catalyst.

16. The invention according to claim 11 wherein said upper and lower boundary layers are formed by a single layer in a spiral wrap.

17. A combination catalytic converter and filter for internal combustion engine exhaust comprising a single unitary flow member having an upstream side and a downstream side, said member having a plurality of flow channels extending axially from said upstream side to said downstream side, each channel having left and right sidewalls formed by pleated filter media, and top and bottom walls formed by respective upper and lower boundary layers, said left and right sidewalls extending axially continuously from said upstream side to said downstream side, said sidewalls having first upstream sections proximate said upstream side, said sidewalls having second downstream sections proximate said downstream side, one of said first and second sections being a catalytic section treated with a catalyst for said exhaust, the other of said first and second sections being a filter section and having axially spaced alternately blocking sealants in alternate said channels such that exhaust must flow through said pleated filter media, wherein said sidewalls of said catalytic section are perforated such that exhaust flows through said catalytic section along a first set of alternate channels axially rectilinearly aligned with a first set of alternate channels in said filter section, and exhaust flows through said catalytic section along a second set of alternate channels laterally offset from said first set of channels and communicating therewith through said perforations, such that exhaust flows through all of the channels of said catalytic section, increasing surface area for catalytic activity, notwithstanding said alternating blocking sealants in said filter section, and wherein:

said catalytic section is axially upstream of said filter section;

said axially spaced alternating blocking sealants comprise a first set of alternating blocking sealants at the upstream end of said filter section and a second set of alternating blocking sealants at the downstream end of said filter section;

said first set of alternate channels in said catalytic section are open at their downstream ends, and exhaust flows rectilinearly from said first set of channels in said catalytic section to said first set of channels in said filter section, the downstream ends of said first set of channels in said filter section being blocked by said second set of said alternating blocking sealants;

said second set of alternate channels in said catalytic section are blocked at their downstream end by said first set of said alternating blocking sealants in the upstream ends of a second set of alternate channels in said filter section;

said perforations are upstream of said first set of alternating blocking sealants, such that exhaust flows axially along said second set of channels in said catalytic section and then laterally through said perforations and joins said flow in said first set of channels in said catalytic section flowing axially rectilinearly into said first set of channels in said filter section.

18. A combination catalytic converter and filter for internal combustion engine exhaust comprising a single unitary flow member having an upstream side and a downstream side, said member having a plurality of flow channels extending axially from said upstream side to said downstream side, each channel having left and right sidewalls formed by pleated filter media, and top and bottom walls formed by respective upper and lower boundary layers, said left and right sidewalls extending axially continuously from said upstream side to said downstream side, said sidewalls having first upstream sections proximate said upstream side, said sidewalls having second downstream sections proximate said downstream side, one of said first and second sections being a catalytic section treated with a catalyst for said exhaust, the other of said first and second sections being a filter section and having axially spaced alternately blocking sealants in alternate said channels such that exhaust must flow through said pleated filter media, wherein said sidewalls of said catalytic section are perforated such that exhaust flows through said catalytic section along a first set of alternate channels axially rectilinearly aligned with a first set of alternate channels in said filter section, and exhaust flows through said catalytic section along a second set of alternate channels laterally offset from said first set of channels and communicating therewith through said perforations, such that exhaust flows through all of the channels of said catalytic section, increasing surface area for catalytic activity, notwithstanding said alternating blocking sealants in said filter section, and wherein:

said filter section is axially upstream of said catalytic section;

said axially spaced alternating blocking sealants comprise a first set of alternating blocking sealants at the upstream end of said filter section and a second set of alternating blocking sealants at the downstream end of said filter section;

said first set of alternate channels in said catalytic section are open at their upstream ends, and exhaust flows rectilinearly from said first set of channels in said filter section to said first set of channels in said catalytic section, the upstream ends of said first set of channels in said filter section being blocked by said first set of said alternating blocking sealants;

said second set of alternate channels in said catalytic section are blocked at their upstream end by said second set of alternating blocking sealants in the downstream ends of said second set of alternate channels in said filter section;

said perforations are downstream of said second set of alternating blocking sealants, such that exhaust flows axially along said first set of channels in said filter section and then some of the exhaust flows laterally through said perforations and then flows axially rectilinearly along said second set of channels in said catalytic section.

19. A combination catalytic converter and filter for internal combustion engine exhaust comprising a single unitary flow member having an upstream side and a downstream side, said member having a plurality of flow channels extending axially from said upstream side to said downstream side, each channel having left and right sidewalls formed by pleated filter media, and top and bottom walls formed by respective upper and lower boundary layers, said left and right sidewalls extending axially continuously from said upstream side to said downstream side, said sidewalls having first upstream sections proximate said upstream side, said sidewalls having second downstream sections proximate said downstream side, one of said first and second sections being a catalytic section treated with a catalyst for said exhaust, the other of said first and second sections being a filter section and having axially spaced alternately blocking sealants in alternate said channels such that exhaust must flow through said pleated filter media, wherein each of said left and right sidewalls of each channel extends axially rectilinearly from said first section to said second section, maintaining exact axial alignment of the respective said channel including the catalyzing and filtering sections thereof, wherein said sidewalls have third downstream sections downstream of said second sections, said second sections being nested between in axial alignment with said first and third sections, each of said left and right sidewalls of each channel extending axially rectilinearly from said first section to said second section to said third section, maintaining exact axial alignment of the respective said channel, wherein said first and third sections are catalytic sections, and said second section is a filter section, and wherein said sidewalls of said first and third catalytic sections are perforated such that exhaust flows through said first catalytic section along a first set of alternate channels axially rectilinearly aligned with a first set of alternate channels in said second filter section, and exhaust flows through said first catalytic section along a second set of alternate channels laterally offset from said first set of channels and communicating therewith through said perforations, such that exhaust flows through all of the channels of said first catalytic section, increasing surface area for catalytic activity, notwithstanding said alternating blocking sealants in said second filter section, and exhaust flows from a second set of alternate channels in said second filter section rectilinearly aligned with a first set of alternate channels in said third catalytic section, and exhaust also flows from said second set of channels in said second filter section through said perforations in said sidewalls of said third catalytic section and then axially along a second set of alternate channels in said third catalytic section, such that exhaust flows through all of the channels in said third catalytic section, increasing surface area for catalytic activity, notwithstanding said alternating blocking sealants in said second filter section.

* * * * *